Aug. 7, 1951 J. J. WALSH 2,563,505
OPEN HEEL SHOE AND THE METHOD OF MAKING THE SAME
Filed June 18, 1947 2 Sheets-Sheet 1

INVENTOR.
JOHN J. WALSH
BY
ATTORNEY.

Aug. 7, 1951   J. J. WALSH   2,563,505
OPEN HEEL SHOE AND THE METHOD OF MAKING THE SAME
Filed June 18, 1947   2 Sheets-Sheet 2

INVENTOR.
JOHN J. WALSH
BY *Alfred W Petchaft*
ATTORNEY

Patented Aug. 7, 1951

2,563,505

UNITED STATES PATENT OFFICE 2,563,505

OPEN HEEL SHOE AND THE METHOD OF MAKING THE SAME

John J. Walsh, St. Louis, Mo.

Application June 18, 1947, Serial No. 755,525

9 Claims. (Cl. 36—19.5)

This invention relates in general to certain new and useful improvements in shoes and the method of making the same.

It is the principal object of the present invention to provide a new and unique method of making shoes and, more particularly, women's shoes, which method is simple, economical, and makes possible the achievement of an accurately fitting shoe of highly attractive, novel design or appearance.

It is also an object of the present invention to provide a novel method of making a shoe which has the casual style and appearance of a force-lasted shoe, but nevertheless has the foot-fitting and wearing qualities of a hand-lasted shoe.

It is an additional object of the present invention to provide a shoe of novel design and appearance which is long-wearing and exceptionally comfortable on the foot of the wearer.

It is a further object of the present invention to provide a shoe of the type stated which possesses a snug-fitting shank construction and therefore accurately fits the foot of the wearer in the region of the arch and instep.

With the above and other objects in view, my invention resides in the novel features of form, construction, arrangement, and combination of parts presently described and pointed out in the claims.

In the accompanying drawings (two sheets)—

Figure 1 is a side elevational view of a wood-last with a platform applied thereto as the first step in the shoe-making method of the present invention;

Figures 2, 3, 4, 5, and 6 are plan views or so-called "pattern views" of the component parts of the upper for making a preferred form of shoe in accordance with the method of the present invention;

Figure 7 is a fragmentary perspective view of the forepart of a shoe made in accordance with the method of the present invention showing the novel appearance and construction achieved thereby;

Figures 8 and 9 are fragmentary sectional views taken along lines 8—8 and 9—9, respectively, of Figure 7;

In broadest outline, the method of the present invention comprises the stitching together of a plurality of suitably patterned upper parts or sections to form a combined upper and open-bottomed platform cover in which a portion of the platform cover extends upwardly into, and forms part of, the toe portion. The combined upper and platform cover is then placed on a last, to the sole face of which a platform has been tacked and the margins of the platform cover pulled over for securement thereto by cementing. The upper is furthermore provided in the region of the shank with a "tuck-in" strip or flap-forming elements which, after removal of the shoe from the last, is manually pulled in over the inside face of the platform and cemented down to give snug arch-fitting shape to the finished shoe. The heel-strip of the platform cover is provided with scalloped tabs which are also pulled over and cemented down on the inside face of the platform and the shoe is finally finished by inserting and cementing an insole or so-called sock-lining upon the inside face of the platform and upon the pulled-over "tuck-in" strip and scalloped tabs of the heel strip.

Figure 1:
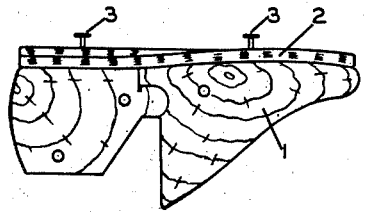
Figure 2:
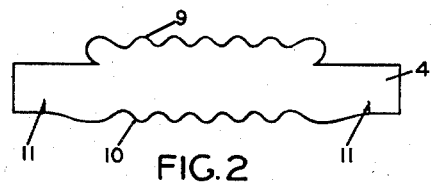
Figure 3:
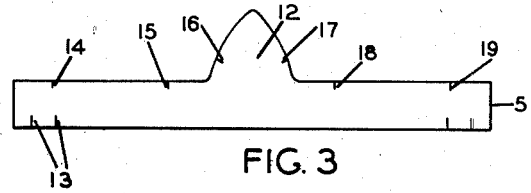
Figures 4, 5:
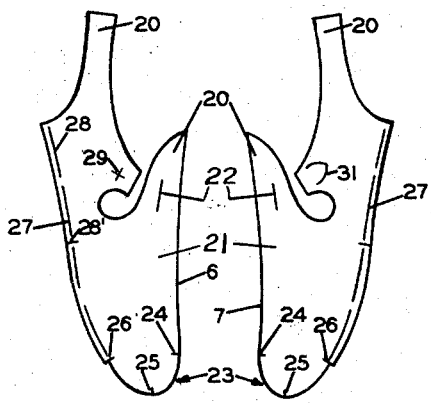
Figure 6:
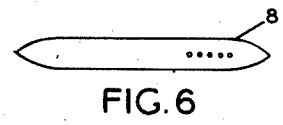

Referring now in more detail and by reference characters to the drawings, I designates a wooden last preferably of two-part hinged construction provided upon its upwardly presented sole face with a wedge-heel platform 2 formed preferably of cork or other similar material and secured in place by two removable tacks 3, as shown in Figure 1. The upper is formed of a heel strip 4, a toe strip 5, two companion-shaped upper sections 6, 7, and a strap 8, as shown in Figures 2 to 6. The heel strip 4 is provided along the mid-portions of its upper and lower margins with scalloped tabs 9, 10, and stretch slits 11, as shown in Figure 2. The toe strip 5 is substantially uniform in width throughout its length, being integrally provided along the mid-portion of its upper margin with a somewhat triangularly shaped toe flap 12 and being provided at suitable points along its margins with stretch slits 13 and match-marks 14, 15, 16, 17, 18, and 19, as shown in Figure 3.

The upper sections 6, 7, are exact opposites or "mirror images," so to speak, and are each provided with heel strap sections 20 and instep sections 21 having slits 22 for accommodating the strap 8 in the finished shoe. It should be noted that the upper sections 6, 7, are curved outwardly in the region of their toe portions as at 23, between match-marks 24, 25, to accommodate the toe flap 12, and are provided along their bottom margins, from slits 26 to the end thereof, with narrow inseam allowances 27, the latter being marked for guidance in stitching with line-marks 28 and match-marks 28'. The upper section 6 is preferably, though not necessarily, provided with a guide-mark 29 for indicating the position of the buckle 30, and, similarly, the upper section 7 is provided with a guide-mark 31 for indicating the proper position of the secured end of the strap 8.

Figure 7:
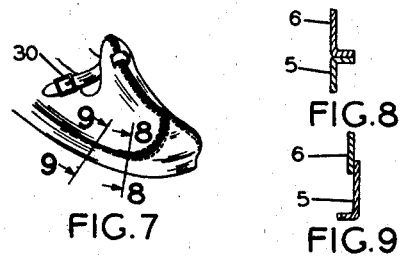
Figure 8:
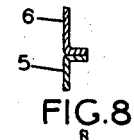
Figure 9:
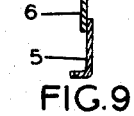
Figure 10:
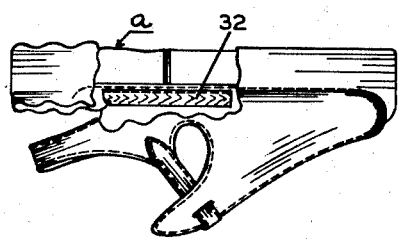
Figure 10 is a side elevational view of a completely assembled upper partly broken away to show the construction in the region of the shank.
Figure 12:
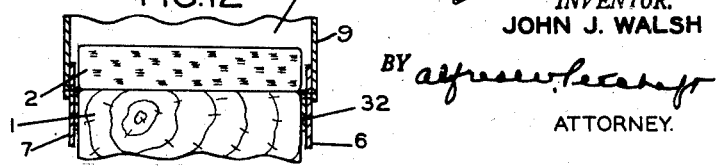
Figure 12 is a fragmentary sectional view taken along line 12—12 of Figure 11.

The upper sections 6, 7, are stitched together at the heel strap sections 20 and outseamed along the margins of the instep sections 21 down to the marks 24 so as to present a smooth interior against the instep of the wearer's foot. The toe strip and heel strip 4, 5, are then endwise stitched together in the formation of an endless loop or platform cover a and the margins of the toe flaps 12 are then outseamed to the curved forward margins of the upper sections 6, 7, the match-marks 16, 17, being aligned with the match-marks 24, 25, respectively, and the match-marks 15, 18, with the slits 26, as best seen in Figures 7 and 8. The outseaming is discontinued at the slits 26 and the toe strip 5 is brought over upon the outer face of the inseam allowances 27 and stitched flatwise thereupon, as shown in Figure 9, and such stitching continued to join the forward portions of the heel strip 4 to the rearward portion of the inseam allowances 27. It should be noted that the inseam allowances 27 terminate at the points where the scalloped tab 9 of the heel strap 4 begins, so that the latter extends above the plane of attachment between the upper sections 6, 7, and the platform cover a. Finally, two narrow strips 32 of fabric tape or flap-forming elements are stitched upon the inside of the upper along the seam line formed by stitching the platform cover a to the upper sections 6, 7, on opposite sides of the shank, as best seen in Figures 10 and 12, and the strap 8 stitched in place.

Figure 13:
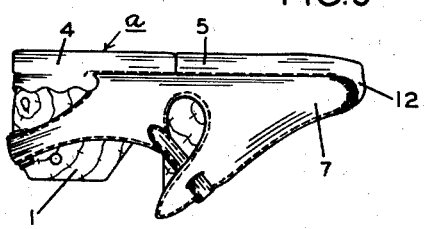
Figure 13 is a side elevational view of the shoe after lasting.
Figure 11:
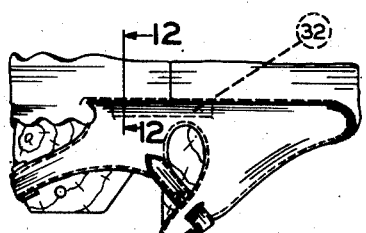
Figure 11 is a side elevational view of the assembled upper in position over the last prior to lasting.
Figure 14:
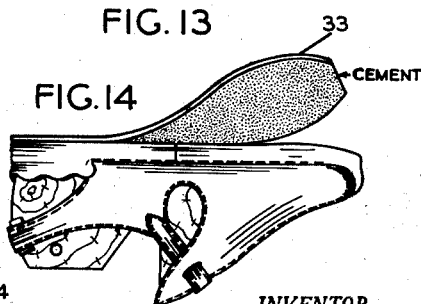
Figure 14 is a side elevational view of the shoe illustrating the process of applying the outer sole thereto.
Figure 15:
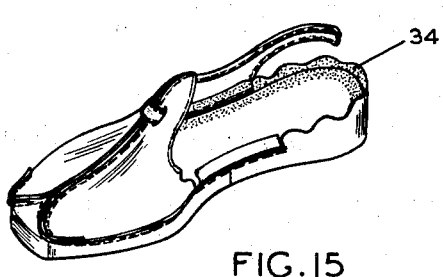
Figure 15 is a perspective view of the shoe after removal from the last, the view being partly broken away to show the internal construction of the shoe at such intermediate stage of the process.
Figure 16:
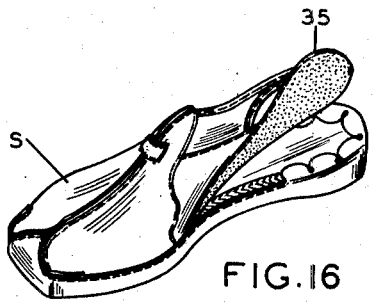
Figure 16 is a perspective view of the shoe illustrating the final operation of inserting the so-called sock-lining, the view being partly broken away to show more clearly the internal construction.

The assembled upper is then placed on the last I, as shown in Figure 11, the margins of the platform cover pulled over the platform 2 and cemented down, as shown in Figure 13, and an outer sole 33 cemented upon the platform 2, as shown in Figure 14. It will be noted that during the lasting operations the scalloped tab 9 and the tape strips or flap-forming elements 32 lie against the side faces of the last I extending downwardly (reference being had to Figure 12), and, of course, will extend upwardly when the shoe is removed from the last I, as shown in Figure 15. Upon removal from the last I, a band of adhesive is applied to the inner face of the platform, as at 34, and to the exposed or inside faces of the scalloped tab 9 and tape strips or flap-forming elements 32. Thereupon, the tape strips 32 are pulled inwardly, drawing the shank of the shoe snugly into conformity with the shank-curve of the platform 2 and in such position the tapes or flap-forming elements 32 are cemented down. Similarly, the tab 9 is cemented down and an insole or so-called sock-lining 35 is cemented in place, as shown in Figure 16, to complete the shoe S.

Figure 18:
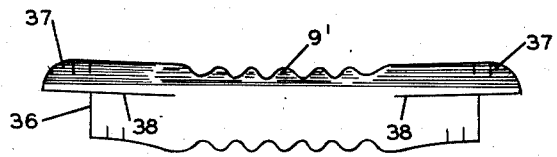
Figure 18 is a plan view or so-called "pattern view" of a heel-covering strip employed in the modified form of shoe shown in Figure 17.
Figure 19:
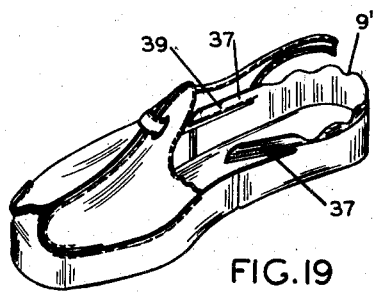
Figure 19 is a perspective view of the assembled upper of the modified form of shoe shown in Figure 17.
Figure 17:
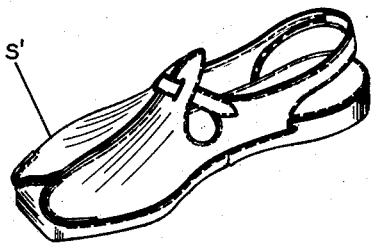
Figure 17 is a perspective view of a modified form of shoe embodying the present invention.
Figure 21:
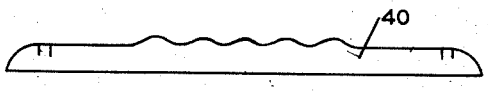
Figures 21 and 22 are plan views or so-called "pattern views" of the two heel-covering strips forming parts of the modified form of shoe shown in Figure 20.
Figure 22:
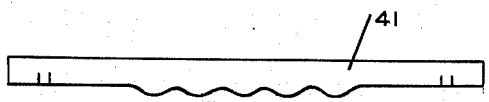

If desired, a modified form of shoe S' may be made employing a heel strip 36, as shown in Figure 18, having outwardly extending end portions in the formation of tuck-in flaps 37 as integral continuations of the scalloped tab 9' and being separated from the main body of the strip 36 by slits 38. The other component parts of the upper are identical with those of the previously described shoe S and are assembled in substantially the same manner except that the integral flap-forming elements 37 are substituted for the tape strips or flap-forming elements 32 and extend inside the assembled upper for securement thereto by stitch lines 39, as shown in Figure 19. The finished shoe S' is substantially identical with the shoe S in external appearance and fitting qualities.

Figure 20:
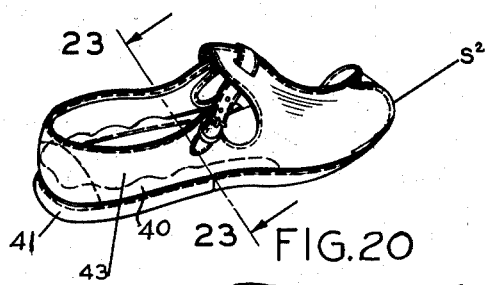
Figure 20 is a perspective view of a further modified form of shoe constructed in accordance with the present invention showing such shoe prior to insertion of the insole for more clearly illustrating the details of construction thereof.
Figure 23:
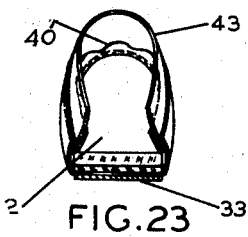
Figure 23 is a transverse sectional view taken along line 23—23 of Figure 20.
Figure 24:
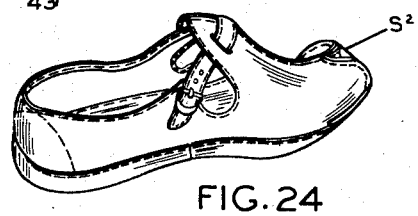
Figure 24 is a perspective view of the modified form of shoe shown in Figure 20 as it appears when completed.

A closed-heel shoe S², as shown in Figure 24, can also be made in accordance with the present invention by employing two heel strip sections 40, 41, which are substituted for the previously described heel strip 4. The heel strip section 41 is stitched flatwise around the heel part of a closed-heel upper 43. The heel strip section 40 is stitched upon the inner face thereof initially in upwardly extending position, as shown in Figures 20 and 23. Subsequently, the heel strip section 40 is pulled in and cemented down to complete the shoe S², as shown in Figure 24.

It should be understood that changes and modifications in the form, construction, arrangement, and combination of the several parts of the shoe and in the method of making the same may be made and substituted for those herein shown and described without departing from the nature and principle of my invention.

Having thus described my invention, what I claim and desire to secure by Letters Patent is:

1. A shoe comprising a platform, an upper, a platform cover stitched directly to the lower margin of the upper, narrow flap-forming elements extending along and on opposite sides of the shank of the shoe and secured flatwise upon the upwardly presented face of the platform for holding the upper in tight shank-hugging conformation to the platform.

2. A shoe comprising a platform, an upper, a platform cover stitched directly to the lower margin of the upper, and narrow tapes extending along and on opposite sides of the shank of the shoe in the region of the seams formed by stitching the upper and platform cover and secured flatwise upon the upwardly presented face of the platform in tight shank-hugging conformation.

3. A shoe comprising a platform, an upper, a platform cover stitched directly to the lower margin of the upper and secured to the platform, and narrow lengths of fabric tape extending along and on opposite sides of the shank of the shoe in the region of the seams formed by stitching the upper and platform cover and secured flatwise down upon the upwardly presented face of the platform in tight shank-hugging conformation.

4. A shoe comprising a platform, an upper, a toe strip, a heel strip, said strips being endwise stitched together in the provision of a platform cover, said cover being stitched directly to the lower margin of the upper and secured to the platform, and narrow flap-forming elements formed integrally with the heel strip and extending on opposite sides of the shank of the shoe in the region of the seams between the upper and platform cover and secured flatwise down upon the upwardly presented face of the platform in tight shank-hugging conformation.

5. The method of making a shoe comprising tacking a platform upon a last, providing an upper, providing a platform cover, stitching the cover directly to the lower margin of the upper, stitching narrow flap-forming elements along and on opposite sides of the shank of the shoe in the region of the seams between the upper and platform cover, lasting the combined upper and cover over the platform, and removing the lasted shoe and thereafter securing the flat-forming elements flatwise down upon the upwardly presented face of the platform thereby pulling the upper into tight shank-hugging conformation with said platform.

6. The method of making a shoe comprising providing an upper having a marginal heel tab extending upwardly around the heel portion of the upper and flap-forming elements extending upwardly along the inside faces of the upper in the region of the shank, placing the upper on a last with the flap-forming elements disposed in flatwise position against the side and rear faces of the last, lasting the upper over a platform, removing the last, pulling the flap-forming elements inwardly and securing them down upon the inner face of the platform to hold the shank and heel portion of the upper in peripheral conformity with the corresponding portions of the platform, and securing an insole inside the shoe over the inner face of the platform and the flap-forming elements.

7. The method of making a shoe comprising providing an upper including a platform cover having a marginal heel tabs extending upwardly around the heel portion of the upper and flap-forming elements extending upwardly along the inside faces of the upper in the region of the shank, placing the upper on a last with the flap-forming elements disposed in flatwise position against the side and rear faces of the last, lasting the upper over a platform, removing the last, pulling the flap-forming elements inwardly and securing them down upon the inner face of the platform to hold the shank and heel portion of the upper in peripheral conformity with the corresponding portions of the platform, and securing an insole inside the shoe over the inner face of the platform and the flap-forming elements.

8. The method of making a shoe comprising providing an upper including a platform cover having a marginal heel tabs extending upwardly around the heel portion of the upper and flap-forming elements extending upwardly along the inside faces of the upper in the region of the shank, placing the upper on a last with the flap-forming elements disposed in flatwise position against the side and rear faces of the last, lasting the upper over a platform, applying a sole to the outer face of the platform, removing the last, pulling the flap-forming elements inwardly and securing them down upon the inner face of the platform to hold the shank and heel portion of the upper in peripheral conformity with the corresponding portions of the platform, pulling the tabs over and securing them down upon the platform and securing an insole inside the shoe over the inner face of the platform and upon the tabs and the flaps.

9. A shoe comprising a platform, a closed-heel upper, a toe-strip, a heel strip, said strips being endwise stitched together in the provision of a platform cover, said cover being stitched directly to the lower margin of the upper, and a tape stitched upon the inside face of the upper and extending around the heel and along both sides of the shank in the region of the juncture between the upper and platform cover, said platform cover being marginally secured to the platform, said tape being secured flatwise down upon the upwardly presented face of the platform thereby holding the shank and heel portions of the upper in tight conformity with the corresponding peripheral portions of the platform.

JOHN J. WALSH.

REFERENCES CITED

The following references are of record in the file of this patent:

UNITED STATES PATENTS

| Number | Name | Date |
|---|---|---|
| 1,319,680 | Lieben | Oct. 21, 1919 |